(12) United States Patent
Keyes

(10) Patent No.: US 7,003,490 B1
(45) Date of Patent: Feb. 21, 2006

(54) MULTIVARIATE RESPONSES USING CLASSIFICATION AND REGRESSION TREES SYSTEMS AND METHODS

(75) Inventor: Tim K. Keyes, West Redding, CT (US)

(73) Assignee: GE Capital Commercial Finance, Inc., Stamford, CT (US)

(*) Notice: Subject to any disclaimer, the term of this patent is extended or adjusted under 35 U.S.C. 154(b) by 623 days.

(21) Appl. No.: 09/619,278

(22) Filed: Jul. 19, 2000

(51) Int. Cl.
*G06F 17/60* (2006.01)

(52) U.S. Cl. ............................. 705/38; 705/35; 705/37
(58) Field of Classification Search ................. 705/38, 705/35, 37
See application file for complete search history.

(56) References Cited

U.S. PATENT DOCUMENTS

| | | |
|---|---|---|
| 5,671,279 A | 9/1997 | Elgamal |
| 5,710,887 A | 1/1998 | Chelliah et al. |
| 5,712,984 A * | 1/1998 | Hammond et al. ............ 705/4 |
| 5,737,440 A | 4/1998 | Kunkler |
| 5,740,271 A | 4/1998 | Kunkler et al. |
| 5,812,668 A | 9/1998 | Weber |
| 5,850,446 A | 12/1998 | Berger et al. |
| 5,889,863 A | 3/1999 | Weber |
| 5,898,919 A | 4/1999 | Yuen |
| 5,917,931 A | 6/1999 | Kunkler |
| 5,931,917 A | 8/1999 | Nguyen et al. |
| 5,940,815 A * | 8/1999 | Maeda et al. ................. 706/12 |
| 5,943,424 A | 8/1999 | Berger et al. |
| 5,978,840 A | 11/1999 | Nguyen et al. |
| 5,983,208 A | 11/1999 | Haller et al. |
| 5,987,132 A | 11/1999 | Rowney |
| 5,987,623 A | 11/1999 | Ushida |
| 5,996,076 A | 11/1999 | Rowney et al. |
| 6,002,767 A | 12/1999 | Kramer |
| 6,014,454 A | 1/2000 | Kunkler |
| 6,016,255 A | 1/2000 | Bolan et al. |
| 6,026,364 A * | 2/2000 | Whitworth ..................... 705/4 |
| 6,026,379 A | 2/2000 | Haller et al. |

FOREIGN PATENT DOCUMENTS

WO      WO 99/03052     *  1/1999

OTHER PUBLICATIONS

Mark Robert Segal, "Tree-Structured Methods for Longitudinal Data," Jun. 1992, vol. 87, No. 418, Theory and Methods, *Journal of the American Statistical Association*.

Yan Yu and Diane Lambert, "Fitting Trees to Functional Data, With an Application to Time of Day Patterns," 1999, unpublished manuscript, (http://www.stat.cornell.edu/Homepages/yyu/index.html), Cornell University.

Heping Zhang, "Classification Trees for Multiple Binary Responses," Mar. 1998, vol. 93, No. 441, Theory and Methods, *Journal of the American Statistical Association*.

(Continued)

*Primary Examiner*—Jagdish N Patel
(74) *Attorney, Agent, or Firm*—Armstrong Teasdale LLP

(57) ABSTRACT

The present invention is a method of allowing inclusion of more than one variable in a Classification and Regression Tree (CART) analysis. The method includes predicting y using p exploratory variables, where y is a multivariate, continuous response vector, describing a probability density function at "parent" and "child" nodes using a multivariate normal distribution, which is a function of y, and defining a split function where "child" node distributions are individualized, compared to the parent node. In one embodiment a system is configured to implement the multivariate CART analysis for predicting behavior in a non-performing loan portfolio.

19 Claims, 4 Drawing Sheets

OTHER PUBLICATIONS

Tim K. Keyes and Martin S. Levy, "Goodness of Prediction Fit for Multivariate Linear Models," Mar. 1996, vol. 91, No. 433, Theory and Methods, *Journal of the American Statistical Association*.

S. Kullback and R. A. Leibler, "On Information And Sufficiency," 1951, *Annals of Mathematical Statistics*, 22, 79-86.

B. Forouraghi, L.W. Schmerr and G. M.Prabhu, "Fuzzy Multiobjective Optimization with Multivariate Regression Trees," 1994, pp. 1400-1405, *The Third IEEE International Conference on Fuzzy systems*.

Leo Breiman, "Bagging Predictors," 1996, pp. 123-140, *Machine Learning*, vol. 24, No. 2.

L. Breiman, J.H. Friedman, R.A. Olshen and C.J. Stone (1984), *Classification and Regression Trees*, Chapters 1, 2, 3, 8 and 11, Wadsworth, Belmont, CA.

S.F. Arnold, *The Theory of Linear Models and Multivariate Analysis*, 1981, Chapters 3, 17, 18, and 19, John Wiley & Sons, New York.

M.J.A. Berry, and G. Linoff, *Mastering Data Mining the Art and Science of Customer Relationship Management*, 1977, Chapters 1, 5 and 7, John Wiley Sons, Inc., New York.

* cited by examiner

MULTIVARIATE RESPONSES USING CLASSIFICATION AND REGRESSION TREES SYSTEMS AND METHODS

BACKGROUND OF THE INVENTION

This invention relates generally to prediction of responses using mathematical algorithms for quality measurements and more specifically to the use of Classification and Regression Tree (CART) analysis for prediction of responses.

In a financing example, an amount collected on a charged off loan is a function of many demographic variables, as well as historic and current information on the debtor. If one desired to predict the amount paid for an individual borrower, a statistical model need be built from an analysis of trends between the account information and the amount paid by "similar" borrowers, that is, borrowers with similar profiles. CART tools allow an analyst to sift, i.e. data mine, through the many complex combinations of these explanatory variables to isolate which ones are the key drivers of an amount paid.

Commercially available tools for CART analysis exist, however, there is no known tool that allows the user to build a model that predicts more than one measurement at a time (i.e., more than one response in a CART application). It would be desirable to develop a CART tool that allows a user to predict more than one measurement at a time, thereby allowing for a multivariate response CART analysis.

BRIEF SUMMARY OF THE INVENTION

The present invention is, in one aspect, a method of allowing inclusion of more than one variable in a Classification and Regression Tree (CART) analysis. The method includes predicting y using p exploratory variables, where y is a multivariate response vector. A statistical distribution function is then described at "parent" and "child" nodes using a multivariate normal distribution, which is a function of y. A split function where "child" node distributions are individualized, compared to the parent node is then defined.

DETAILED DESCRIPTION OF THE INVENTION

Classification and Regression Tree (CART) analysis is founded on the use of p explanatory variables, $X_1, X_2, \ldots, X_p$, to predict a response, y, using a multi-stage, recursive algorithm as follows:

1. For each node, P, evaluate every eligible split, s, of the form $X_i \in S$, $X_i \notin S$, on each predictor variable, by associating a split function, $\phi(s,P) \geq 0$ which operates on P. The split forms a segregation of data into two groups. The set S can be derived in any useful way.

2. Choose the best split for each node according to $\phi(s,P)$. This could be the maximum or minimum split function value for that node, for example. Each split produces two child nodes.

3. Repeat 1 and 2 for each child node.

4. Stop when apriori conditions are met.

Figure 1:
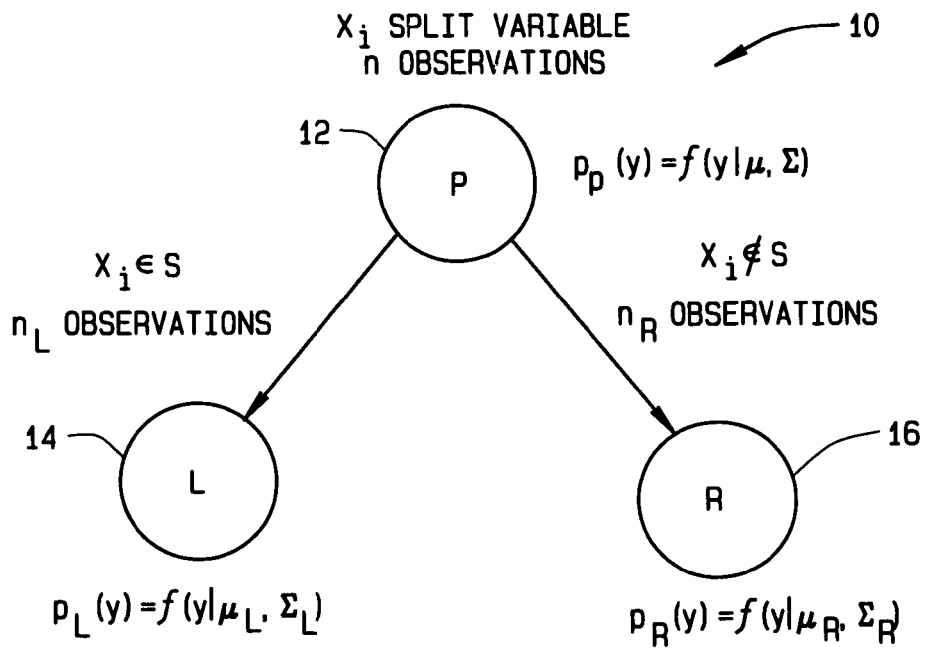
FIG. 1 is a single node split diagram.

FIG. 1 illustrates a single split 10 where a heterogeneous parent node, P, 12 is observed to identify a split that is used to segregate a heterogeneous parent node, 12 into more homogeneous child nodes, such as node L 14 and node R 16, as defined by an appropriate measure of diversity. Diversity can be a function of the data, $\{y_k\}_{k=1}^n$, or of an assumed distribution, $p(y) = f(y|\mu,\Sigma)$ being the probability density function, or both.

The p(y) notation is used, with subscripts where appropriate, to describe probability density function at the parent and child nodes in the sequel. Parameter nomenclature typically associated with multivariate continuous distributions is used in FIG. 1, but the concept applies universally. It is assumed that the observations are independent.

Several measures of diversity in the univariate response setting have been advocated. One, called Node Impurity, is negative entropy:

$$I(P) = -\int \log(p(y))p(y)dy$$

with a split function defined as $\phi(s,P) = I(P) - I(L) - I(R)$.

Other known regression tree methodologies include longitudinal data by using split functions that addressed within-node homogeneity in either mean structure (a Hotelling/Wald-type statistic) or covariance structure (a likelihood ratio split function), but not both. Another methodology uses five multivariate split criteria that involved measures of generalized variance, association, and fuzzy logic. In addition, the use of tree methods on multiple binary responses, and introducing a generalized entropy criterion has been investigated.

CART analysis and methodology can be applied, for example, for valuation of non-performing commercial loans. A valuation of n non-performing commercial loans involves ascribing (underwriting) the loans with values for a recovery amount, expressed as a percentage of unpaid principal balance, and a value for recovery timing, expressed in months after an appropriate baseline date (e.g., date of acquisition). Recovery amount and timing information is sufficient to calculate the present value of future cash flows, a key part of portfolio valuation. Underwriters of defaulted loans use their individual and collective experience to ascribe these values. Statistical models can be used to associate underwriters' values with key loan attributes that shed light on the valuation process.

Figure 2:
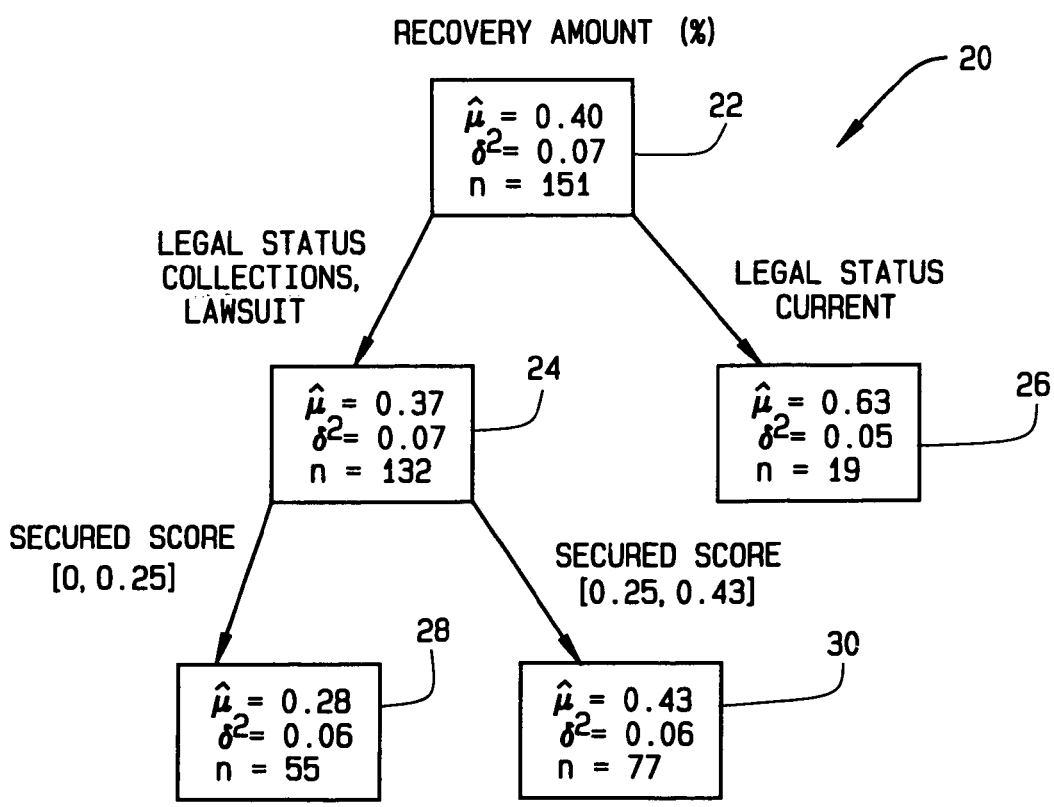
FIG. 2 is a univariate Classification and Regression Tree (CART) model for recovery amount.

FIG. 2 illustrates a univariate CART model 20 for a percentage recovery amount for non-performing commercial loans. Statistics at each node are included in the rectangle representing the node. Node 22 shows a number, n which represents the number of loans in the analysis. In the example of FIG. 2, n is equal to 151. The 151 loans are examined for a split, and as noted in nodes 24 and 26, 132 of the loans have a legal status as being in collections or the subject of a lawsuit, shown in node 24, while nineteen of the loans are classified as being current as shown in node 26. Nodes 28 and 30 signify where another split has been identified between the 132 loans of node 24 relating to a secured score which is a scoring model prediction of whether or not the borrower account is collateralized (secured by real estate).

Figure 3:
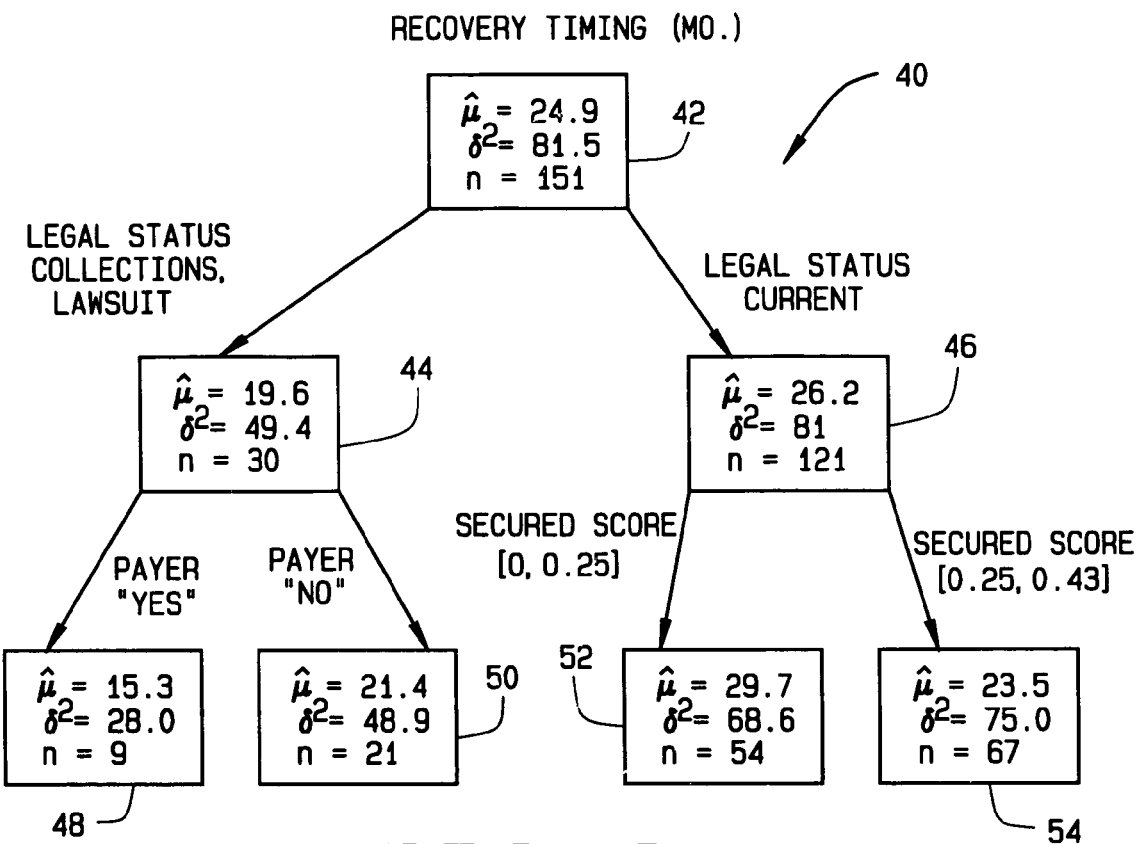
FIG. 3 is a univariate CART model for recovery timing.

FIG. 3 illustrates a univariate CART model 40 for a recovery timing amount in months for non-performing commercial loans. Statistics at each node are included in the rectangle representing the node. Node 42 shows a number, n which represents the number of loans in the analysis. In the example of FIG. 3, n is equal to 151. The 151 loans are examined for a split, and as noted in nodes 44 and 46, thirty of the loans have a legal status as being in collections or the subject of a lawsuit, shown in node 44, while 121 of the loans are classified as being current as shown in node 46. Nodes 48 and 50 signify where another split has been identified between the thirty loans of node 44, node 48 signifying that payers have paid in the last twelve months in nine of the thirty loans in node 44 and node 50 signifying that no payments have been made in the last twelve months for twenty-one of the thirty loans. Nodes 52 and 54 signify where another split has been identified between the 121 loans of node 46 relating to a secured score which is a scoring model prediction of whether or not the borrower's account is collateralized (secured by real estate).

In the multivariate normal case, the node impurity equation results in $$\varphi(s, P) = \frac{n}{2}\log(|\Sigma_P|) - \frac{n_L}{2}\log(|\Sigma_L|) - \frac{n_R}{2}\log(|\Sigma_R|).$$

An implementation using the above equation, with maximum likelihood estimations imputed, when compared to the split function acts as a diversity measure on covariance structure only. A Hotelling/Wald-type statistic, as a diversity measure on mean structure only, results in:

$$\varphi(s, P) = \frac{n_L n_R}{n_L + n_R}(\mu_L - \mu_R)'\Sigma^{-1}(\mu_L - \mu_R).$$

Figure 4:
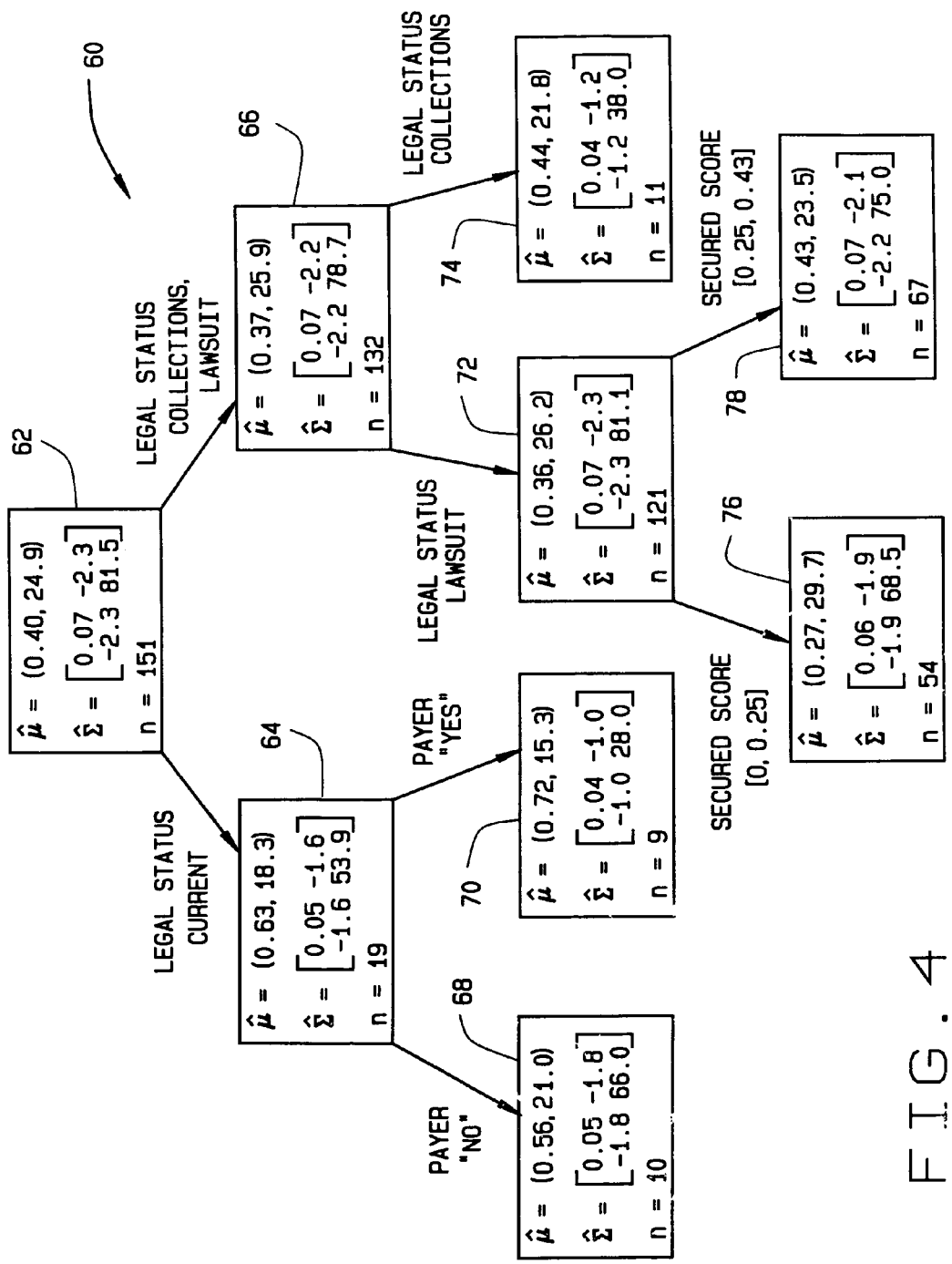
FIG. 4 is a multivariate CART model for recovery amount and timing using negative entropy and Hotelling.

FIG. 4 illustrates a single CART model 60, resulting from an implementation version of either of the covariance structure split function equation or the mean structure split function equation above. The explanatory variables used in the analysis are: account status, secured score, and legal status which are described above. Using an example of 151 commercial loans, a split is identified in node 62 regarding the legal status of the 151 loans. Node 64 signifies that nineteen of the 151 loans have a legal status of current, while node 66 signifies that 132 of the 151 loans are in collections or are the subject of a lawsuit. Splits are identified in both nodes 64 and 66. The split in node 64, the nineteen loans that are current, is indicated in node 68 which shows that ten of the nineteen loans have had no payment activity over the last twelve months and node 70 shows that nine of the nineteen loans from node 64 have had payment activity.

Node 66 is split into two nodes 72 and 74 where node 72 signifies that 121 of the 132 loans of node 66 are the subject of a lawsuit, while node 74 signifies that eleven of the loans are in collections. The 121 loans of node 72 are further separated into nodes 76 and 78, showing that of the 121 loans that are subjects of lawsuits, 54 are secured by assets such as real estate, shown in node 76, while 67 of the loans are unsecured, shown by node 78.

Typically, in known applications, separate CART models are built for each response variable. Described below are applications where a single multivariate CART model, which uses multiple response variables, is built. The form of the probability density function under multivariate normality is:

$$p(y) = f(y|\mu, \Sigma) = (2\pi)^{-\frac{nr}{2}}|\Sigma|^{-\frac{1}{2}}\exp\left\{-\frac{1}{2}tr(y-\mu)\Sigma^{-1}(y-\mu)'\right\},$$

where n=sample size (number of observations), r=number of response variables, y=n×r matrix of response values, $\mu$=n×r matrix of mean response values, where each row is the same r-vector mean, and $\Sigma$=r×r matrix of covariance values for the responses. The structure of the above equation encompasses repeated measures and time series models. It is assumed that the observations are not correlated, i.e., the covariance matrix for the rows of y is the identity matrix of size n. Node homogeneity, as depicted in FIG. 1, results in individualized probability density functions for each node. In general terms, the split function of the present invention is $$\varphi(s, P) = KL(p_L p_R, p_P) = \int \log\left(\frac{p_L p_R}{p_P}\right) p_L p_R dy = E_{L,R}\left[\log\left(\frac{p_L p_R}{p_P}\right)\right]$$

where $$E_{L,R}\left[\log\left(\frac{p_L p_R}{p_P}\right)\right]$$

signifies the expected value, taken over the joint distribution arising from the child nodes. Note that the implied node impurity measure in the above equation is related to the node impurity equation in the univariate case, in that node impurity is measured in comparison with a proposed split, s, and the child probability density functions involved:

$$I(s,P) = -\int \log(p_p(y))p_L(y_L)p_R(y_R)dy_L dy_R = -E_{L,R}[\log(p_p(y))].$$

Under probability density function for p(y), the split function φ is calculated, using matrix calculus:

$$\varphi(s, P) = -\frac{n_L}{2}\log\left(\frac{|\Sigma_L|}{|\Sigma|}\right) - \frac{n_R}{2}\log\left(\frac{|\Sigma_R|}{|\Sigma|}\right) - \frac{n \times r}{2} + \frac{n_L}{2}tr(\Sigma^{-1}\Sigma_L) +$$
$$\frac{n_R}{2}tr(\Sigma^{-1}\Sigma_R) + \frac{1}{2}tr(\Sigma^{-1}(\mu_L - \mu)'(\mu_L - \mu)) + \frac{1}{2}tr(\Sigma^{-1}(\mu_R - \mu)'(\mu_R - \mu)).$$

In one embodiment, the present invention uses Kullback-Liebler divergence as a node split criterion. This criterion has an interpretation related to the node impurity function earlier described. Kullback-Liebler divergence is a general measure of discrepancy between probability distributions, that is usually a function of mean and covariance structure.

That φ(s,P) is a valid split function is guaranteed by the information inequality, which states that $KL(p_L p_R, p_p) \geq 0$, and equals zero if and only if $p_L p_R = p_p$, i.e., the parent node is optimally homogeneous. Kullback-Liebler divergence, in this context, measures the information gain, resulting from the use of individualized statistical distributions for the child nodes in FIG. 1, compared to a single statistical distribution, as for the parent node. Maximizing φ(s,P) will produce the best split. Use of the above equation for the split function requires the estimation of parameters $(\mu, \Sigma)$, $(\mu_L, \Sigma_L)$ and $(\mu_R, \Sigma_R)$ from the data in each node, P, L, R, respectively. This is done by the usual method of maximum likelihood estimation.

Figure 5:
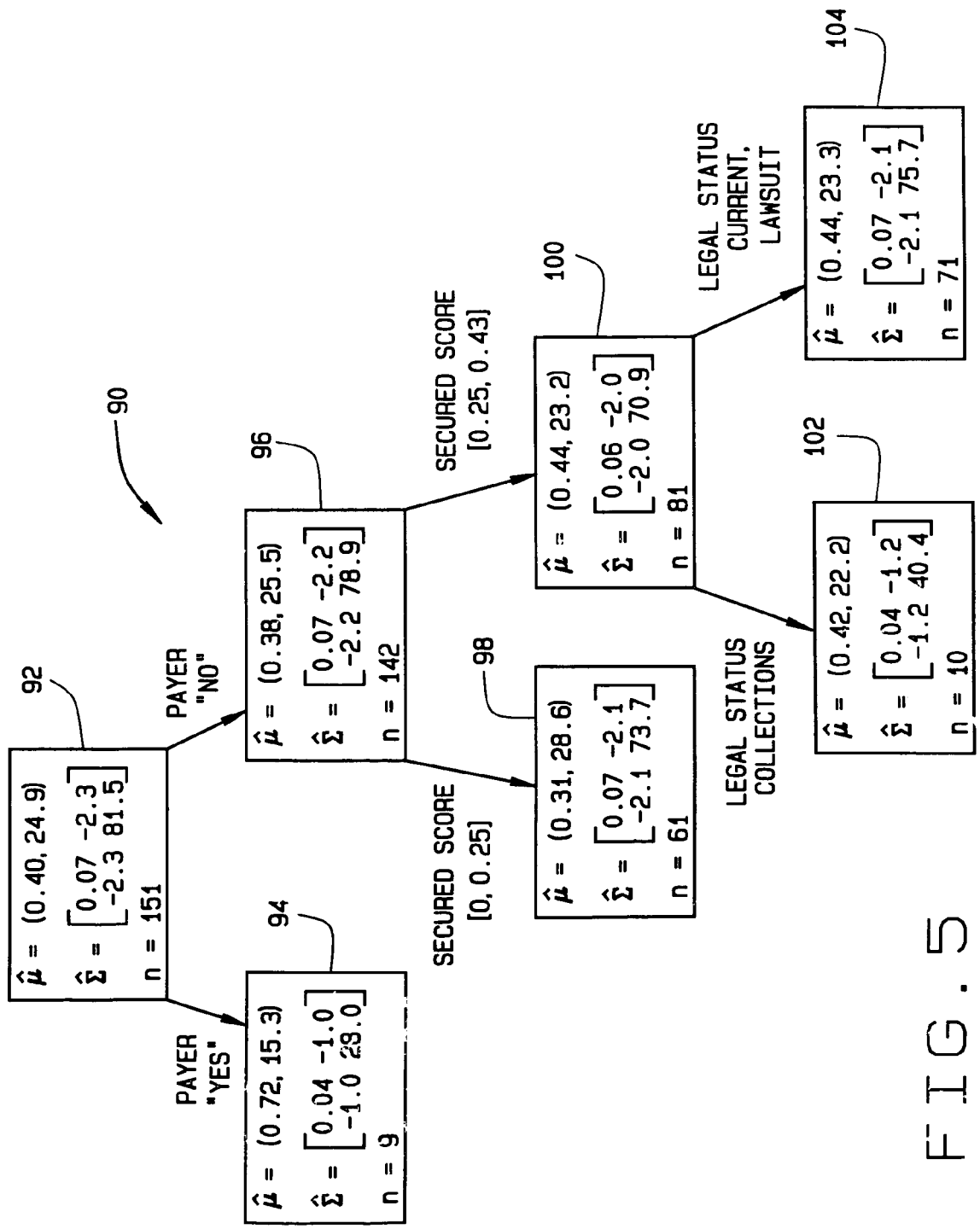
FIG. 5 is a multivariate CART model for recovery amount and timing using Kullback-Liebler Divergence.

FIG. 5 displays a single CART model 90, resulting from an implementation version using maximum likelihood estimations of the split function, $\phi(s,P)$ defined above. The explanatory variables used in the analysis are: account status, secured score, and legal status which are described above and again the 151 commercial loans example is used. As shown in FIG. 5, using model 90, a split is identified in node 92 regarding account activity of the 151 loans over the past twelve months, resulting in a split into nodes 94 and 96. In node 96 where no payments have been received for 142 of the original 151 loans another split is identified, regarding the secured status of the 142 loans. Node 98 shows that 61 of the 142 loans of node 96 are secured, perhaps by real estate, while node 100 shows that 81 of the 142 loans of node 96 are unsecured. A split identified in node 100 results in nodes 102 and 104, where node 102 represents that ten of the 81 loans of node 100 are in collections, while node 104 represents that 71 of the 81 loans of node 100 have a legal status of being current or in lawsuit.

Another split function used in practice for univariate response settings, and adaptable for multivariate responses is the least squares split function:

$$\varphi(s, P) = \sum_P (y_i - \bar{y}_P)^2 - \sum_L (y_i - \bar{y}_L)^2 - \sum_R (y_i - \bar{y}_R)^2$$

$$= \frac{n_L^2 n_R + n_R^2 n_L}{n} [\bar{y}_L - \bar{y}_R]^2$$

where $\bar{y}$ signifies the sample average of observations, with the subscript designating from which node the sum and averages come. The split function equation $$\varphi(s, P) = -\frac{n_L}{2} \log\left(\frac{|\Sigma_L|}{|\Sigma|}\right) - \frac{n_R}{2} \log\left(\frac{|\Sigma_R|}{|\Sigma|}\right) - \frac{n \times r}{2} + \frac{n_L}{2} tr(\Sigma^{-1} \Sigma_L) +$$

$$\frac{n_R}{2} tr(\Sigma^{-1} \Sigma_R) + \frac{1}{2} tr(\Sigma^{-1} (\mu_L - \mu)'(\mu_L - \mu)) + \frac{1}{2} tr(\Sigma^{-1} (\mu_R - \mu)'(\mu_R - \mu)).$$

in this case reduces to $\Sigma = \sigma^2 = \Sigma_L = \Sigma_R$, r=1, and the implementation version of the above equation, with maximum likelihood estimations imputed is proportional to:

$$\varphi(s, P) = \frac{n_L^2 + n_R^2}{n} [\bar{y}_L - \bar{y}_R]^2$$

and agrees with the least squares equation, but for the dependence on sample sizes $n_L$ and $n_R$.

Figure 6:
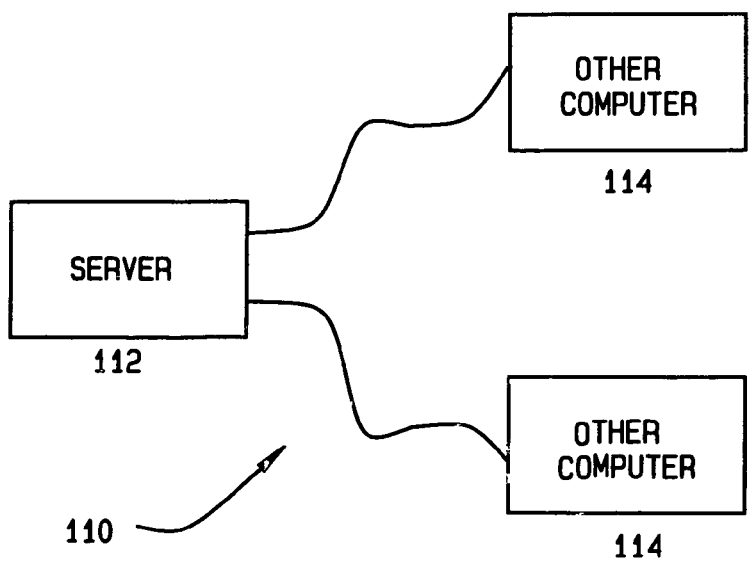
FIG. 6 is a system block diagram.

FIG. 6 illustrates an exemplary system 110 in accordance with one embodiment of the present invention. System 110 includes a computer configured as a server 112 and a plurality of other computers 114 coupled to server 112 to form a network. The network of computers may be local area networks (LAN) or wide area networks (WAN).

Server 112 is configured to perform multivariate CART analysis to assess valuation and to predict future performance in non-performing commercial loans. In one embodiment, server 112 is coupled to computers 114 via a WAN or LAN. A user may dial or directly login to an Intranet or the Internet to gain access. Each computer 114 includes an interface for communicating with server 112. The interface allows a user to input data relating to a portfolio of non-performing loans and to receive valuations of the loans and predictions future loan performance. A CART analysis tool, as described above, is stored in server 112 and can be accessed by a requester at any one of computers 114.

As shown by the commercial loan example, multivariate CART response methodology is useful for determination of recovery timings and amounts and has efficiency over known univariate response models in that one model is used to data mine multiple through multiple covariates to predict future loan performances.

While the invention has been described in terms of various specific embodiments, those skilled in the art will recognize that the invention can be practiced with modification within the spirit and scope of the claims.

What is claimed is:

1. A method of allowing inclusion of more than one variable in a classification and regression tree analysis for valuing a portfolio of non-performing loans and predicting future performance of the portfolio of non-performing loans using p explanatory variables, said method comprising the steps of:

defining a first "parent" node representing the portfolio of non-performing loans;

defining a split function to determine whether to create "child" nodes by generating a probability density function of the p explanatory variables at a corresponding parent node using a multivariate normal distribution;

creating "child" nodes when a split function value for the corresponding parent node and child nodes indicates that the parent node is statistically non-homogeneous with respect to at least one of the p variables, wherein statistical non-homogeneity is determined by comparing the split function value for the corresponding parent and child nodes, and wherein statistical non-homogeneity indicates a greater predictive value included within at least one of the created child nodes as compared to the corresponding parent node;

repeating said steps of defining a split function and creating "child" nodes until the parent node is statistically homogeneous;

calculating y based on the p explanatory variables and the defined split functions, wherein y is a multivariate response vector representing a predicted recovery amount and a predicted timing value, the predicted recovery amount including at least one amount predicted to be recovered for each non-performing loan included within the portfolio of non-performing loans, the predicted timing value including at least one value predicting when each predicted recovery amount will be recovered, wherein the calculation is performed by a computer; and determining a value of the portfolio of non-performing loans based on the calculated y.

2. A method according to claim 1 wherein said step of defining a split function further comprises the step of defining $p(y) = f(y|\mu, \Sigma)$, where $p(y)$ represents a statistical distribution generated at each "parent" and "child" node.

3. A method according to claim 2 wherein said step of defining a split function further comprises the step of defining the split function as $$\varphi(s, P) = KL(p_L p_R, p_P) = \int \log\left(\frac{p_L p_R}{p_P}\right) p_L p_R \, dy = E_{L,R}\left[\log\left(\frac{p_L p_R}{p_P}\right)\right]$$

where $$E_{L,R}\left[\log\left(\frac{p_L p_R}{p_P}\right)\right]$$

signifies the expected value, taken over the joint distribution arising from the child nodes.

4. A method according to claim 2 further comprising the step of defining the probability density function as $$p(y) = f(y|\mu, \Sigma) = (2\pi)^{-\frac{nr}{2}} |\Sigma|^{-\frac{1}{2}} \exp\left\{-\frac{1}{2} tr(y-\mu)\Sigma^{-1}(y-\mu)'\right\},$$

where p(y) represents a statistical distribution generated at each "parent" and "child" node which is also a multivariate distribution function, and n=sample size (number of observations), r=number of response variables, y=n×r matrix of response values, $\mu$=n×r matrix of mean response values, where each row is the same r vector mean, and $\Sigma$=r×r matrix of covariance values for the responses.

5. A method according to claim 4 wherein said step of defining a split function further comprises the step of defining the split function as $$\varphi(s, P) = KL(p_L p_R, p_P) = \int \log\left(\frac{p_L p_R}{p_P}\right) p_L p_R \, dy = E_{L,R}\left[\log\left(\frac{p_L p_R}{p_P}\right)\right]$$

where $$E_{L,R}\left[\log\left(\frac{p_L p_R}{p_P}\right)\right]$$

signifies the expected value, taken over the joint distribution arising from the child nodes.

6. A method according to claim 5, wherein for a probability density function for p(y), the split function is calculated using matrix calculus as:

$$\varphi(s, P) = -\frac{n_L}{2}\log\left(\frac{|\Sigma_L|}{|\Sigma|}\right) - \frac{n_R}{2}\log\left(\frac{|\Sigma_R|}{|\Sigma|}\right) - \frac{n \times r}{2} + \frac{n_L}{2} tr(\Sigma^{-1}\Sigma_L) +$$

$$\frac{n_R}{2} tr(\Sigma^{-1}\Sigma_R) + \frac{1}{2} tr(\Sigma^{-1}(\mu_L - \mu)'(\mu_L - \mu)) + \frac{1}{2} tr(\Sigma^{-1}(\mu_R - \mu)'(\mu_R - \mu)).$$

7. A method according to claim 6 wherein said step of defining a split function further comprises the step of using maximum likelihood estimation (MLE) for parameter estimation of $\mu$ and $\Sigma$.

8. A method according to claim 6 further comprising the step of choosing a split such that the split function $\phi$ is maximized.

9. A system for performing multivariate classification and regression tree analysis for valuing a portfolio of non-performing loans using p explanatory variables, said system comprising:
at least one computer having a user interface for enabling a user to input information relating to the portfolio of non-performing loans;
a server in communication with the at least one computer, said server configured to read input information relating to the portfolio of non-performing loans, said server further configured to perform the steps of:
defining a first "parent" node representing the portfolio of non-performing loans,
defining a split function to determine whether to create "child" nodes by generating a probability density function of the p explanatory variables at a corresponding parent node using a multivariate normal distribution,
creating "child" nodes when a split function value for the corresponding parent node and child nodes indicates that the parent node is statistically non-homogeneous with respect to at least one of the p variables, wherein statistical non-homogeneity is determined by comparing the split function value for the corresponding parent and child nodes, and wherein statistical non-homogeneity indicates a greater predictive value included within at least one of the created child nodes as compared to the corresponding parent node,
repeating said steps of defining a split function and creating "child" nodes until the parent node is statistically homogeneous,
calculating y based on the p explanatory variables and the defined split functions, wherein y is a multivariate response vector representing a predicted recovery amount and a predicted timing value, the predicted recovery amount including at least one amount predicted to be recovered for each non-performing loan included within the portfolio of non-performing loans, the predicted timing value including at least one value predicting when each predicted recovery amount will be recovered, and
determining a value of the portfolio of non-performing loans based on the calculated y; and
a network connecting said computer to said server.

10. A system according to claim 9 wherein said server is configured to describe a probability density function further according to p(y)=f(y|$\mu,\Sigma$), where p(y) represents a statistical distribution generated at each "parent" and "child" node.

11. A system according to claim 10 wherein said server configured to define a split function as $$\varphi(s, P) = KL(p_L p_R, p_P) = \int \log\left(\frac{p_L p_R}{p_P}\right) p_L p_R \, dy = E_{L,R}\left[\log\left(\frac{p_L p_R}{p_P}\right)\right]$$

where $$E_{L,R}\left[\log\left(\frac{p_L p_R}{p_P}\right)\right]$$

signifies the expected value, taken over the joint distribution arising from the child nodes.

12. A system according to claim 10 wherein said server is configured to describe a probability density function according to $$p(y) = f\left(y|\mu, \Sigma\right) = (2\pi)^{-\frac{nr}{2}}|\Sigma|^{-\frac{1}{2}}\exp\left\{-\frac{1}{2}tr(y-\mu)\Sigma^{-1}(y-\mu)'\right\},$$

where p(y) is a multivariate distribution function, and n=sample size (number of observations), r=number of response variables, y=n×r matrix of response values, $\mu$=n×r matrix of mean response values, where each row is the same r vector mean, and $\Sigma$=r×r matrix of covariance values for the responses.

13. A system according to claim 12 wherein said server configured to define a split function as $$\varphi(s, P) = KL(p_L p_R, p_P) = \int \log\left(\frac{p_L p_R}{p_P}\right) p_L p_R dy = E_{L,R}\left[\log\left(\frac{p_L p_R}{p_P}\right)\right]$$

where $$E_{L,R}\left[\log\left(\frac{p_L p_R}{p_P}\right)\right]$$

signifies the expected value, taken over the joint distribution arising from the child nodes.

14. A system according to claim 13, wherein for a probability density function for p(y), said server is configured to calculate the split function using matrix calculus as:

$$\varphi(s, P) = -\frac{n_L}{2}\log\left(\frac{|\Sigma_L|}{|\Sigma|}\right) - \frac{n_R}{2}\log\left(\frac{|\Sigma_R|}{|\Sigma|}\right) - \frac{n \times r}{2} + \frac{n_L}{2}tr(\Sigma^{-1}\Sigma_L) + \frac{n_R}{2}tr(\Sigma^{-1}\Sigma_R) + \frac{1}{2}tr(\Sigma^{-1}(\mu_L - \mu)'(\mu_L - \mu)) + \frac{1}{2}tr(\Sigma^{-1}(\mu_R - \mu)'(\mu_R - \mu)).$$

15. A system according to claim 10 wherein said server is configured to define a split function using maximum likelihood estimation (MLE) for parameter estimation of $\mu$ and $\Sigma$.

16. A system according to claim 10 wherein said server is configured to choose a split such that the split function $\phi$ is maximized.

17. A system according to claim 9 wherein said server is configured to allow a user to submit information relating to non-performing loan portfolios via the Internet.

18. A system according to claim 9 wherein said server is configured to allow a user to submit information relating to non-performing loan portfolios via an Intranet.

19. A system according to claim 9 wherein said network is one of a wide area network and a local area network.

\* \* \* \* \*